(12) United States Patent
Janssen

(10) Patent No.: US 11,987,135 B2
(45) Date of Patent: May 21, 2024

(54) ELECTRIC DRIVE TRAIN WITH START-UP SUPPORT

(71) Applicant: FEV Group GmbH, Aachen (DE)

(72) Inventor: Peter Janssen, Stein (NL)

(73) Assignee: FEV EUROPE GMBH, Aachen (DE)

( * ) Notice: Subject to any disclaimer, the term of this patent is extended or adjusted under 35 U.S.C. 154(b) by 697 days.

(21) Appl. No.: 17/132,404

(22) Filed: Dec. 23, 2020

(65) Prior Publication Data

US 2021/0188099 A1 Jun. 24, 2021

(30) Foreign Application Priority Data

Dec. 23, 2019 (DE) .......................... 102019135657.1

(51) Int. Cl.
| | |
|---|---|
| *B60L 15/20* | (2006.01) |
| *B60L 50/00* | (2019.01) |
| *F16H 45/02* | (2006.01) |
| *F16H 57/04* | (2010.01) |
| *H02K 7/00* | (2006.01) |
| *H02K 7/10* | (2006.01) |
| *H02K 9/19* | (2006.01) |

(52) U.S. Cl.
CPC ....... *B60L 15/2045* (2013.01); *B60L 15/2054* (2013.01); *B60L 50/00* (2019.02); *F16H 45/02* (2013.01); *F16H 57/0412* (2013.01); *F16H 57/0476* (2013.01); *H02K 7/006* (2013.01); *H02K 7/10* (2013.01); *H02K 9/19* (2013.01); *F16H 2045/0215* (2013.01)

(58) Field of Classification Search
CPC .. B60L 15/2045; B60L 15/2054; B60L 50/00; F16H 45/02; F16H 57/0412; F16H 57/0476; F16H 2045/0215; H02K 7/006; H02K 7/10; H02K 9/19
See application file for complete search history.

(56) References Cited

U.S. PATENT DOCUMENTS

| | | | |
|---|---|---|---|
| 2016/0153546 A1* | 6/2016 | Ogawa | F16H 57/0457 74/665 F |
| 2019/0092157 A1 | 3/2019 | Sekiguchi et al. | |
| 2019/0173343 A1* | 6/2019 | Yamaguchi | H02K 9/19 |
| 2019/0173344 A1* | 6/2019 | Ishikawa | H02K 1/32 |
| 2019/0173352 A1* | 6/2019 | Yamaguchi | H02K 9/19 |
| 2019/0173359 A1* | 6/2019 | Ishikawa | H02K 1/32 |
| 2019/0178365 A1* | 6/2019 | Ishikawa | F16H 57/0493 |
| 2019/0181720 A1* | 6/2019 | Yamaguchi | H02K 5/04 |

(Continued)

*Primary Examiner* — Erez Gurari
(74) *Attorney, Agent, or Firm* — Burris Law, PLLC

(57) ABSTRACT

An electric drive train for a pure electrically operated vehicle includes an electric motor with a motor shaft and a start-up support unit mechanically connected to the motor shaft configured to convert a motor speed and a motor torque of the motor shaft into an output speed and an output torque such that the output speed is lower than the motor speed and/or the output torque is higher than the motor torque. Also, a method of operating an electric drive train during a start-up process includes increasing a start-up motor speed and a start-up motor torque of a motor shaft of an electric motor, converting the start-up motor speed and the start-up motor torque into a start-up output speed and a start-up output torque with a start-up support unit, and closing a lock-up clutch of the start-up support unit.

19 Claims, 3 Drawing Sheets

(56) References Cited

U.S. PATENT DOCUMENTS

| | | | |
|---|---|---|---|
| 2019/0186622 A1* | 6/2019 | Ishikawa | H02K 7/083 |
| 2020/0300353 A1* | 9/2020 | Ishikawa | F16H 57/037 |
| 2021/0044173 A1* | 2/2021 | Ishikawa | H02K 7/116 |
| 2021/0167667 A1* | 6/2021 | Ishikawa | H02K 9/19 |
| 2021/0188099 A1* | 6/2021 | Janssen | B60W 10/08 |
| 2022/0049768 A1* | 2/2022 | Nakamatsu | F16H 57/045 |
| 2022/0099177 A1* | 3/2022 | Tamura | B60K 1/00 |
| 2022/0158522 A1* | 5/2022 | Ishikawa | H02K 7/116 |
| 2022/0271628 A1* | 8/2022 | Miki | H02K 11/25 |

* cited by examiner

ELECTRIC DRIVE TRAIN WITH START-UP SUPPORT

CROSS-REFERENCE TO RELATED APPLICATIONS

This application claims priority to and the benefit of German Patent Application No. 102019135657.1, filed on Dec. 23, 2019. The disclosures of the above applications are incorporated herein by reference.

FIELD

The present disclosure relates to an electric drive train and a method for operating an electric drive train.

BACKGROUND

The statements in this section merely provide background information related to the present disclosure and may not constitute prior art.

An electric vehicle with an electric motor, a torque converter arranged coaxially to an output shaft of the electric motor and an automatic transmission arranged on a power transmission path between the electric motor and the drive wheels is disclosed in US 2019/0092157 A1.

SUMMARY

This section provides a general summary of the disclosure and is not a comprehensive disclosure of its full scope or all of its features.

An electric drive train for a purely electrically operated vehicle according to the present disclosure comprises
an electric motor with a motor shaft and
a start-up support unit mechanically connected to the motor shaft, configured to convert a motor speed and a motor torque of the motor shaft into an output speed and an output torque, wherein the output speed is lower than the motor speed and/or the output torque is higher than the motor torque.

In the following, efficiencies are understood to be energy efficiencies.

During a start-up processes of purely electric vehicles, electric motors are typically operated in first power ranges, which are characterized by low motor speeds and low motor efficiencies. This can result in high thermal loads on electric motor poles and/or inverter elements.

In that the electric drive train of the present disclosure comprises a start-up support unit configured to convert a motor speed and torque of the motor shaft into an output speed and an output torque, an electric motor can be operated during a start-up process in a second power range, in which it has a higher efficiency compared to the first power range. In the second power range, the electric motor generates a start-up motor torque and a start-up motor speed, which are converted by the start-up support unit into a start-up output torque and a start-up output speed.

In one form of the present disclosure, an electric drive train for a pure electrically operated vehicle includes an electric motor with a motor shaft and a start-up support unit mechanically connected to the motor shaft. The start-up unit is configured to convert a motor speed and a motor torque of the motor shaft into an output speed and an output torque such that the output speed is lower than the motor speed and/or the output torque is higher than the motor torque.

In some variations, the start-up support unit is a hydrodynamic torque converter. In such variations the electric motor can include a liquid cooling system which is hydraulically connected to the hydrodynamic torque converter.

In at least one variation, the start-up support unit is configured to generate a start-up output torque of at least 1.5 times a start-up motor torque during a start-up process for a start-up motor speed that is lower than 15% of a maximum motor speed.

In at least one variation, the start-up support unit is a hydrodynamic torque converter comprising at least one of a fixed torque ratio, a variable torque ratio, a fixed speed ratio, and a variable speed ratio. For example, in some variations, the start-up support unit is a hydrodynamic torque converter comprising a fixed torque ratio. In other variations, the start-up support unit is a hydrodynamic torque converter comprising a variable torque ratio. And in some variations, the start-up support unit is a hydrodynamic torque converter comprising a fixed speed ratio. In other variations, the start-up support unit is a hydrodynamic torque converter comprising a variable speed ratio.

In at least one variation, the electric motor is configured to operate in a continuous range of operating power with the motor torque greater than or equal to 50% and less than or equal to 90% of a maximum motor torque of the electric motor.

In some variations, the start-up support unit is configured to apply a reproducible, speed-dependent electric motor start-up resistance to the electric motor during the start-up process.

In at least one variation, the start-up support unit is configured to operate the electric motor during a start-up process with a start-up output torque in a start-up power range with an average electric motor start-up efficiency greater than 80%. In such variations, a power-loss related average thermal load on an electric motor pole of the electric motor can be a factor or less than 1.2 higher than an average thermal load on the electric motor pole in a continuous operating power range.

In some variations, the start-up support unit comprises a lock-up clutch.

In at least one variation, the electric drive train further includes a transmission and the start-up support unit is a hydrodynamic torque converter positioned between the electric motor and the transmission.

In another form of the present disclosure, an electric drive train for a pure electrically operated vehicle includes an electric motor with a motor shaft, a hydrodynamic torque converter mechanically connected to the motor shaft, and a liquid cooling system which is hydraulically connected to the hydrodynamic torque converter. The hydrodynamic torque converter is configured to convert a motor speed and a motor torque of the motor shaft into an output speed and an output torque, and the output speed is lower than the motor speed and/or the output torque is higher than the motor torque. Also, the hydrodynamic torque converter is configured to generate a start-up output torque of at least 1.5 times a start-up motor torque during a start-up process for a start-up motor speed that is lower than 15% of a maximum motor speed.

In some variations, the start-up support unit is configured to operate the electric motor during a start-up process with a start-up output torque in a start-up power range with an average electric motor start-up efficiency greater than 80%. And in at least one variation, a power-loss related average thermal load on an electric motor pole of the electric motor is a factor or less than 1.2 higher than an average thermal load on the electric motor pole in a continuous operating power range.

In still another form of the present disclosure, a method of operating an electric drive train during a start-up process includes increasing a start-up motor speed and a start-up motor torque of a motor shaft of an electric motor, converting the start-up motor speed and the start-up motor torque into a start-up output speed and a start-up output torque with a start-up support unit such that the start-up output speed is lower than the start-up motor speed and/or the start-up output torque is higher than the start-up motor torque. The method also includes closing a lock-up clutch of the start-up support unit. Closing the lock-up clutch terminates torque and/or speed conversions by the start-up support unit and thereby inhibits conversion-related energy losses of the start-up support unit. In some variations, the electric motor operates with an average electric motor start-up efficiency greater than 80% during the start-up process.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
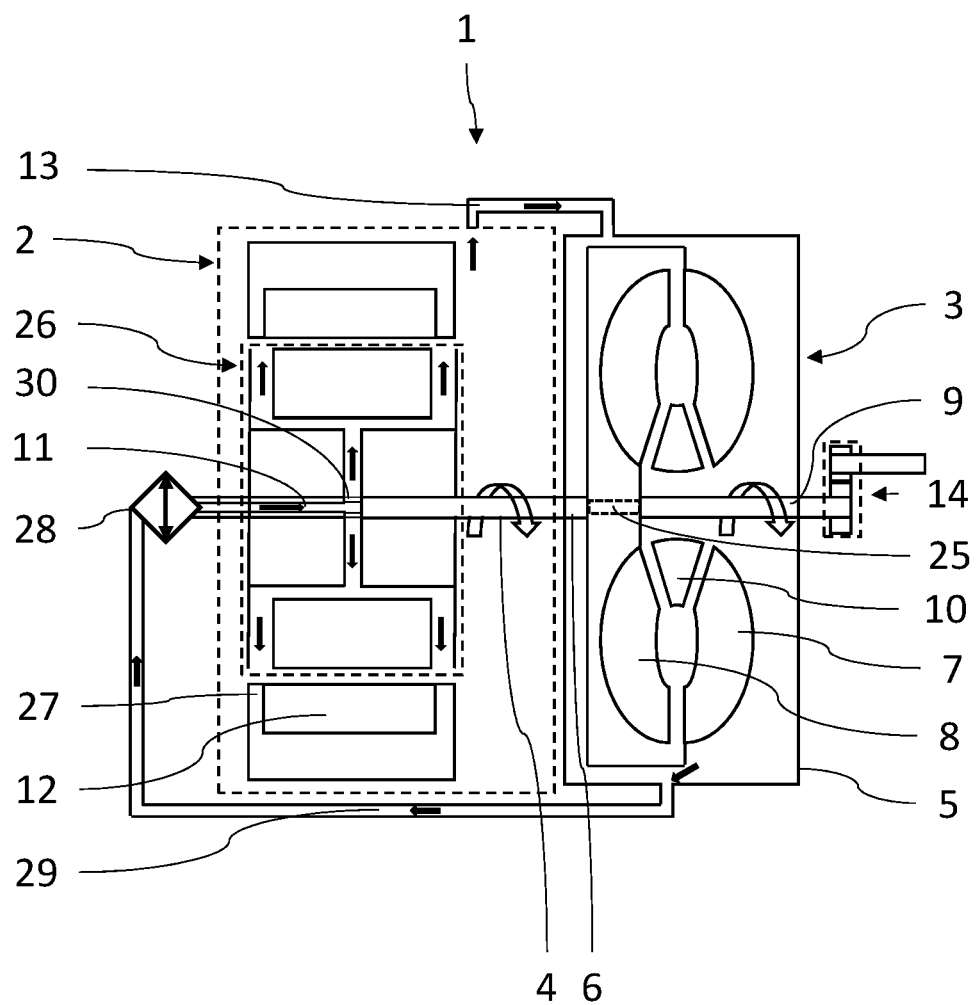
FIG. 1 shows one form of an electrical drive train according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows one form of an electrical drive train 1 according to the teachings of the present disclosure. In some variations, the electric drive train is for a pure or all-electric vehicle. The electric drive train 1 comprises an electric motor 2, constructed as a permanent magnet synchronous motor 2 with a motor shaft 4, a rotor 26 and a stator 27.

Furthermore, the electric drive train 1 comprises a start-up support unit 3. In the described embodiment, the start-up support unit 3 is a hydrodynamic torque converter 3 (also referred to herein simply as a "torque converter"). The torque converter 3 comprises an oil-tight housing 5, which is filled with an oil (not shown), a drive shaft 6, which is mechanically connected to the motor shaft 4, and a pump impeller 7, which is connected to the drive shaft 6. Furthermore, the torque converter 3 comprises a turbine 8, which is connected to an output shaft 9 and a stator 10, which is connected to the housing 5. The pump impeller 7 converts mechanical energy of the drive shaft 6 into flow energy of the oil. The stator 10 causes an oil back pressure, which leads to an increase in torque at or of the turbine 8. The turbine 8 converts the flow energy of the oil into mechanical energy of or at the output shaft 9 in the form of an output speed and an output torque. That is, the flow of oil drives or rotates the turbine 8 and the turbine 8 drives the output shaft 9 at an output speed and an output torque.

The electric drive train 1 further comprises a centrifugal oil cooling system with a cooler 28. A supply line 29 connects the cooler 28 hydraulically to the hydrodynamic torque converter 3. The motor shaft 4 of the electric motor 2 comprises a cooling channel 11, which is hydraulically connected to the cooler 28 (see FIG. 1). In an area in which the motor shaft 4 is enclosed by the rotor 26, motor shaft 4 has bores 30 that open or provide a hydraulic connection between the cooling channel 11 and an outer rotor surface (not labeled). During operation, oil is pumped from the hydrodynamic torque converter 3 into the rotor 26 through the supply line 29, cooler 28 and cooling channel 11. A centrifugal force causes oil to flow out of the rotor 26 onto poles 12 of the stator 27, thereby cooling the poles 12. The oil then flows back into the hydrodynamic torque converter 3 through a return channel 13. In FIG. 1, oil flow directions are indicated by filled black arrows.

The electric drive train 1 further comprises a transmission 14, which in some variations has a fixed torque and speed ratio, and which is connected to the output shaft 9 of the hydrodynamic torque converter 3. In at least one variation the hydrodynamic torque converter 3 is continuously variable. In the form described in FIG. 1, the electric drive train 1 does not include any further torque and/or speed converters. Thus, the torque and/or speed converters of the electric drive train 1 have fixed or continuously variable torque and/or speed ratios.

Figure 2:
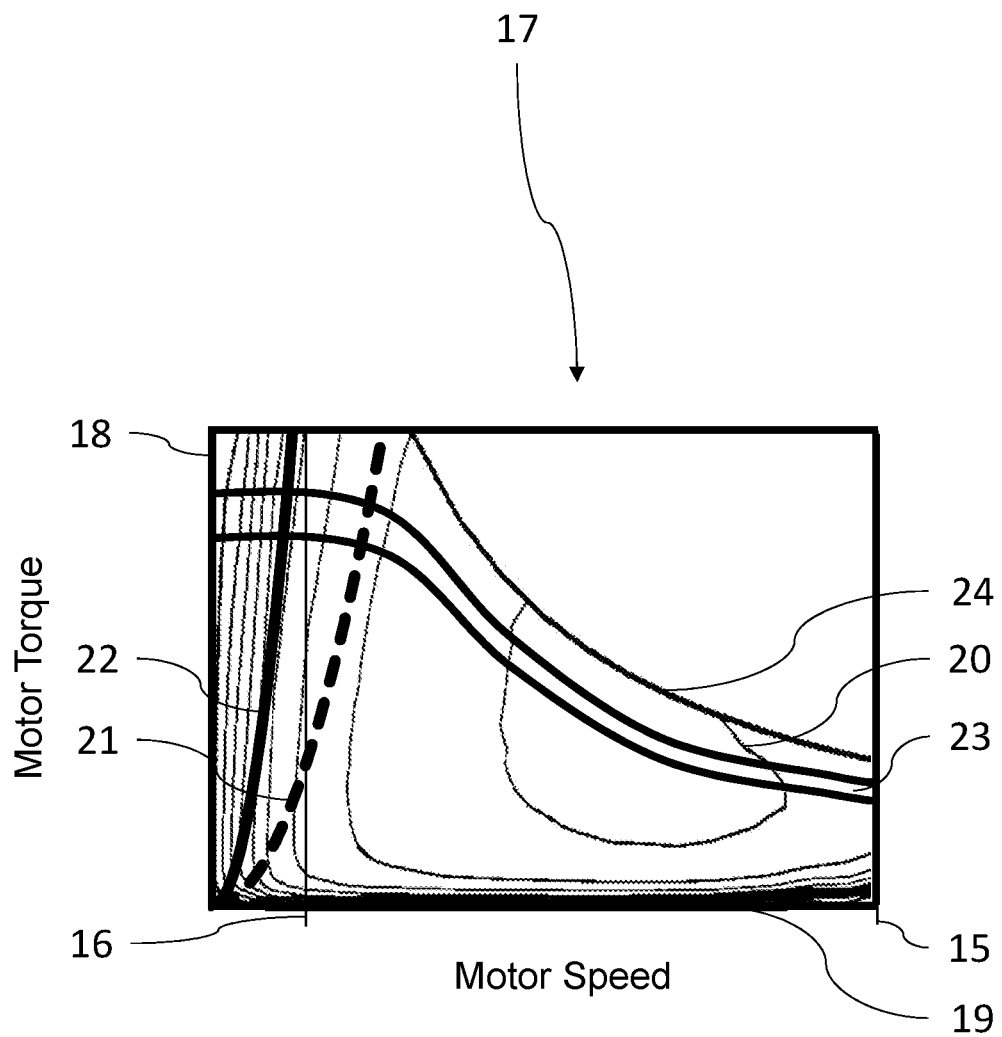
FIG. 2 shows an operating parameter diagram of an electric drive train.

In some variations of the present disclosure, the electric drive train 1 is part of a vehicle and operated during a start-up process. The start-up process is characterized by a start-up motor speed of the motor shaft 4 being less than 15% of a maximum motor speed 15 (FIG. 2). In at least one variation, the maximum motor speed is 15000 revolutions per minute (rpm). The maximum motor speed 15 and a 15% value 16 of the maximum motor speed are marked in an operating parameter diagram 17 in FIG. 2. The operating parameter diagram 17 shows a two-dimensional plot of motor torques of the electric motor 2 on a Y-axis 18 and motor speeds of electric motor 2 on an X-axis 19 at different operating points. FIG. 2 further shows level lines 20, which indicate electric motor operating points of equal motor efficiency.

In some variations, a start-up motor torque increases progressively with a start-up motor speed during a start-up process. The increase of the start-up motor torque is shown in a first characteristic curve 21 in FIG. 2. The start-up motor torque and the start-up motor speed are converted into a start-up output torque and a start-up output speed by means of the hydrodynamic torque converter 3. In at least one variation, the start-up output torque is 2.5 times the start-up motor torque. The start-up output torque also increases progressively with the start-up output speed. The progressive increase of the start-up output torque is shown in a second characteristic curve 22 in FIG. 2.

In some variations, the torque conversion during the start-up process enables operation of electric motor 2 in a start-up power range which is characterized by an average electric motor start-up efficiency greater than 80%. Due to the high average electric motor start-up efficiency, an average thermal load of an electric motor pole (e.g., poles 12)

and an inverter switch during the start-up process according to the teachings of the present disclosure is by a factor of less than 1.2 higher than in a continuous operating power range of electric motor 2. That is, in some variations the average thermal load of the poles 12 and an inverter switch (not labeled) of the electric motor 2 during a start-up process is higher or greater than the average thermal load during a continuous operating power range of the electric motor 2 by a factor of less than 1.2. As used herein, the phrase "thermal load" is understood to be an electric motor pole temperature (e.g., a temperature of poles 12) or inverter switch temperature. Also, the continuous operating power range 23 is characterized by the fact that the motor torque is between 75% and 85% of a maximum motor torque 24 (FIG. 2). The continuous operation of the electric motor 2 at such high motor torques (i.e., between 75% and 85% of maximum motor torques) is enabled by a high cooling capacity of the centrifugal oil cooling and the continuous operating power range 23 and the maximum motor torque 24 are shown in FIG. 2.

Furthermore, the hydrodynamic torque converter 3 enables the electric motor 2 to be operated with a reproducible, speed-dependent electric motor start-up resistance during the start-up process. Therefore, and according to the teachings of the present disclosure, the electric drive train 1 provides for the use of resolvers, as typically applied in variable-speed synchronous motors, to be avoided.

In some variations, the hydrodynamic torque converter 3 further includes a lock-up clutch 25, which is a repeatably connectable and releasable torsionally stiff mechanical connection between the drive shaft 6 and the output shaft 9 of the hydrodynamic torque converter 3.

Figure 3:
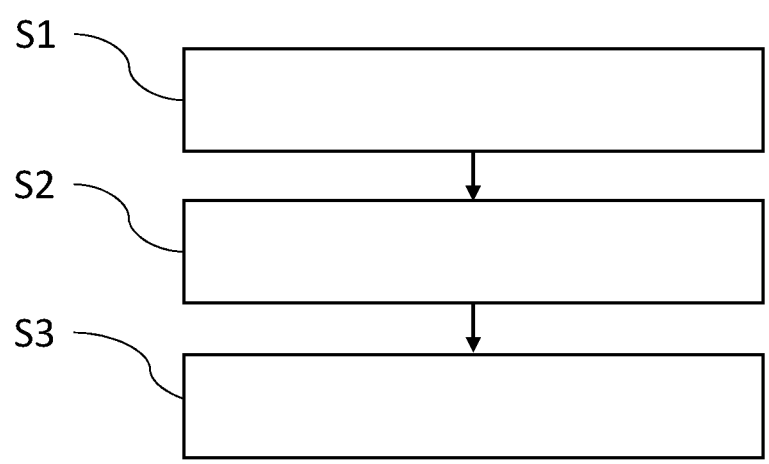
FIG. 3 shows one form of a method of operating an electric drive train during a start-up process according to the teachings of the present disclosure.

During a start-up process, the electric drive train 1 is operated with the following procedure (see FIG. 3). At the beginning of the process, the lock-up clutch 25 of the hydrodynamic torque converter 3 is open and the electric motor 2 is at a standstill. In a first step S1, the start-up motor speed and the start-up motor torque of the motor shaft 4 are increased. The start-up motor torque increases progressively with the start-up motor speed (e.g., see curve 21 or 22 in FIG. 2). In a second step S2, which is executed in parallel to the first step S1, the start-up motor speed and the start-up motor torque are converted into a start-up output speed and a start-up output torque by means of the hydrodynamic torque converter 3. In some variations the start-up output torque is 2.5 times higher than the start-up motor torque and is suitable for accelerating the vehicle during the start-up process. In a third step S3, which is executed subsequent the first and second steps S1, S2, the lock-up clutch 25 of the hydrodynamic torque converter 3 is closed. This reduces power loss of the hydrodynamic torque converter 3.

In another form of the present disclosure an electric motor is included and an inverter is connected to the electric motor. Both the electric motor and the inverter are smaller than in conventional electric drive trains of the same power. The smaller dimensioning is enabled by operating the electric motor in a higher continuous operating power range than in conventional electric drive trains.

A still another form of the present disclosure, an electric drive train comprises a centrifugal oil cooling system with a radiator and a cooling circuit pump. The cooling circuit pump is mounted directly in front of the radiator. During operation, the cooling circuit pump generates a forced circulation of a cooling medium.

In yet another form of an electric drive train according to the teachings of the present disclosure, the start-up support unit is a magnetic powder clutch.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electric drive train for a pure electrically operated vehicle, comprising
    an electric motor with a motor shaft; and
    a start-up support unit mechanically connected to the motor shaft,
    wherein the start-up support unit is configured to to convert a motor speed and a motor torque of the motor shaft into an output speed and an output torque, wherein at least one of the output speed is lower than the motor speed and the output torque is higher than the motor torque, and
    wherein the start-up support unit is a hydrodynamic torque converter.

2. The electric drive train according to claim 1, wherein the electric motor comprises a liquid cooling system which is hydraulically connected to the hydrodynamic torque converter.

3. The electric drive train according to claim 1, wherein the start-up support unit is configured to generate a start-up output torque of at least 1.5 times a start-up motor torque during a start-up process for a start-up motor speed that is lower than 15% of a maximum motor speed.

4. The electric drive train according to claim 1, wherein the electric motor is configured to operate in a continuous range of operating power with the motor torque greater than or equal to 50% and less than or equal to 90% of a maximum motor torque of the electric motor.

5. The electric drive train according to claim 1, wherein the start-up support unit is configured to apply a reproducible, speed-dependent electric motor start-up resistance to the electric motor during a start-up process.

6. The electric drive train according to claim 1, wherein the start-up support unit is configured to operate the electric motor during a start-up process with a start-up output torque in a start-up power range having an average electric motor start-up efficiency greater than 80%.

7. The electric drive train according to claim 1, wherein a power-loss related average thermal load on an electric motor pole of the electric motor is a factor or less than 1.2 higher than an average thermal load on the electric motor pole in a continuous operating power range.

8. The electric drive train according to claim 1, wherein the start-up support unit comprises a lock-up clutch.

9. The electric drive train according to claim 1 further comprising a transmission, wherein the hydrodynamic torque converter is positioned between the electric motor and the transmission.

10. An electric drive train for a pure electrically operated vehicle, comprising
an electric motor with a motor shaft;
a hydrodynamic torque converter mechanically connected to the motor shaft; and
a liquid cooling system which is hydraulically connected to the hydrodynamic torque converter, wherein:
the hydrodynamic torque converter is configured to convert a motor speed and a motor torque of the motor shaft into an output speed and an output torque;
the output speed is lower than the motor speed and the output torque is higher than the motor torque; and
the hydrodynamic torque converter is configured to generate a start-up output torque of at least 1.5 times a start-up motor torque during a start-up process for a start-up motor speed that is lower than 15% of a maximum motor speed.

11. The electric drive train according to claim 10, wherein the hydrodynamic torque converter is configured to operate the electric motor during a start-up process with a start-up output torque in a start-up power range having an average electric motor start-up efficiency greater than 80%.

12. The electric drive train according to claim 11, wherein a power-loss related average thermal load on an electric motor pole of the electric motor is a factor or less than 1.2 higher than an average thermal load on the electric motor pole in a continuous operating power range.

13. The electric drive train according to claim 11, wherein the hydrodynamic torque converter comprises a lock-up clutch.

14. The electric drive train according to claim 1 further comprising a transmission, wherein the hydrodynamic torque converter is positioned between the electric motor and the transmission.

15. A method of operating an electric drive train during a start-up process, comprising the steps of:
increasing a start-up motor speed and a start-up motor torque of a motor shaft of an electric motor;
converting the start-up motor speed and the start-up motor torque into a start-up output speed and a start-up output torque with a start-up support unit, wherein at least one of the start-up output speed is lower than the start-up motor speed and the start-up output torque is higher than the start-up motor torque; and
closing a lock-up clutch of the start-up support unit.

16. The method according to claim 15, wherein the electric motor operates with an average electric motor start-up efficiency greater than 80% during the start-up process.

17. The method according to claim 15, wherein the start-up support unit is a hydrodynamic torque converter generating a start-up output torque of at least 1.5 times a start-up motor torque during a start-up process for a start-up motor speed that is lower than 15% of a maximum motor speed.

18. The method according to claim 15, wherein the electric operates in a continuous range of operating power with the motor torque greater than or equal to 50% and less than or equal to 90% of a maximum motor torque of the electric motor.

19. The electric drive train according to claim 15, wherein the start-up support unit applies a reproducible, speed-dependent electric motor start-up resistance to the electric motor during a start-up process.

* * * * *